US008296718B2

(12) United States Patent
Appleyard et al.

(10) Patent No.: US 8,296,718 B2
(45) Date of Patent: Oct. 23, 2012

(54) SOA SOFTWARE COMPONENTS THAT ENDURE FROM PROTOTYPING TO PRODUCTION (75) Inventors: James P. Appleyard, North Richland Hills, TX (US); Edwin J. Bruce, Corinth, TX (US); Romelia H. Flores, Keller, TX (US); Joshua L. Purcell, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 1300 days.

(21) Appl. No.: 11/932,266

(22) Filed: Oct. 31, 2007

(65) Prior Publication Data
US 2009/0113385 A1    Apr. 30, 2009

(51) Int. Cl.
*G06F 9/44* (2006.01)
(52) U.S. Cl. ........ 717/102; 717/103; 717/106; 717/108; 717/120; 703/23; 709/204; 709/217; 709/220
(58) Field of Classification Search ........................ None
See application file for complete search history.

(56) References Cited

U.S. PATENT DOCUMENTS

| 6,854,107 | B2 | 2/2005 | Green et al. |
| 7,158,940 | B2 | 1/2007 | Cimral et al. |
| 2002/0054086 | A1 | 5/2002 | Van Oostenbrugge et al. |
| 2002/0169852 | A1 | 11/2002 | Schaeck |
| 2003/0014560 | A1 | 1/2003 | Mugica et al. |
| 2003/0107596 | A1 | 6/2003 | Jameson |
| 2004/0001565 | A1 | 1/2004 | Jones et al. |
| 2004/0090969 | A1 | 5/2004 | Jerrard-Dunne et al. |
| 2004/0093381 | A1* | 5/2004 | Hodges et al. ................ 709/204 |
| 2004/0183831 | A1 | 9/2004 | Ritchy et al. |
| 2004/0225955 | A1 | 11/2004 | Ly |
| 2004/0249664 | A1 | 12/2004 | Broverman et al. |
| 2005/0125772 | A1 | 6/2005 | Kohno |
| 2005/0154701 | A1 | 7/2005 | Parunak et al. |
| 2005/0267789 | A1 | 12/2005 | Satyadas et al. |
| 2006/0184883 | A1 | 8/2006 | Jerrard-Dunne et al. |
| 2006/0235733 | A1* | 10/2006 | Marks .............................. 705/7 |
| 2007/0011126 | A1* | 1/2007 | Conner et al. .................. 706/47 |
| 2007/0130561 | A1 | 6/2007 | Siddaramappa et al. |
| 2007/0169016 | A1 | 7/2007 | Aakolk et al. |

(Continued)

OTHER PUBLICATIONS

"SOA Workplace Portal: Emissions Dashboard", IBM Corp., Nov. 11, 2006.

(Continued)

*Primary Examiner* — Isaac Tecklu
(74) *Attorney, Agent, or Firm* — Patents on Demand P.A.; Brian K. Buchheit; Scott M. Garrett (57) ABSTRACT

The disclosed invention presents a multi-phased approach for developing a service oriented architecture (SOA) solution using front end SOA components that endure throughout the SOA development lifecycle. The approach can determine interface requirements between a set of services to be implemented in a SOA solution and SOA front end. The SOA front end can conform to the determined interface requirements. The SOA front end can also be interactively utilized early within and can be applicable to all phases of a SOA lifecycle, which includes design, development, and implementation phases. The SOA front end can be combined with a service emulator to form an interactive prototype of the SOA solution. The SOA front end can also be combined with a set of SOA back end components to form the SOA solution.

19 Claims, 5 Drawing Sheets

U.S. PATENT DOCUMENTS

| | | | |
|---|---|---|---|
| 2007/0198312 A1 | 8/2007 | Bagchi et al. | |
| 2007/0203766 A1 | 8/2007 | Adler et al. | |
| 2008/0086541 A1* | 4/2008 | Simpson et al. | 709/217 |
| 2008/0120129 A1* | 5/2008 | Seubert et al. | 705/1 |
| 2008/0127047 A1* | 5/2008 | Zhang et al. | 717/104 |
| 2008/0209392 A1* | 8/2008 | Able et al. | 717/105 |
| 2008/0285481 A1* | 11/2008 | Hao et al. | 370/254 |
| 2009/0089039 A1* | 4/2009 | Shufer et al. | 703/23 |
| 2009/0089078 A1* | 4/2009 | Bursey | 705/1 |
| 2009/0099855 A1* | 4/2009 | Narendra et al. | 705/1 |
| 2009/0112646 A1* | 4/2009 | Bruce et al. | 705/7 |
| 2009/0157419 A1* | 6/2009 | Bursey | 705/1 |

OTHER PUBLICATIONS

Suri, J., et al., "Building Mashup Portlets," Sun Microsystems, Aug. 24, 2006.

"A Primer on Enterprise Mashups: Productivity Drivers for the Web 2.0 Application Style," Kapow Technologies, 2007.

Chen, I.Y., et al., "An SOA-based software deployment management system," 2006 IEEE/WIC/ACM Int'l Conf. on Web Intelligence, 2006.

"Interface for Creating Custom, End-User, Role Based Application Interface", Disclosure No. IPCOM13828D, IBM Corporation, Oct. 2000.

* cited by examiner

SOA SOFTWARE COMPONENTS THAT ENDURE FROM PROTOTYPING TO PRODUCTION

BACKGROUND

1. Field of the Invention

The present invention relates to the field of SOA technologies and, more particularly, to SOA software components that endure from prototyping to production.

2. Description of the Related Art

A services oriented architecture (SOA) produces software implemented business solutions that consist of a set of loosely coupled, black-box software components interoperating to deliver well defined levels of services. That is, services in a SOA serve as an abstraction layer that hide core system implementation from clients and provide a simple loosely coupled way to integrate both service consumer and provider. The coupling is based upon simple XML based messages and open standards that describe the protocol for service discovery and invocation (e.g., UDDI, WSDL, and SOAP). Each interaction among SOA software components is independent of each and every other interaction and the interconnect protocols of the communicating devices upon which the SOA software components execute.

One of the more significant strengths of a SOA architecture is its flexibility and robustness. Software components written in any language, targeted for any platform, and/or adhering to any design methodology can be adapted to conform to SOA requirements, thus becoming SOA components able to be integrated within a SOA solution. For example, legacy code can be "SOA wrapped" and changed into SOA components, which can interact with other software components of a SOA solution. Thus, SOA solutions permit a strong leveraging of existing IT assets. This flexibility is a direct offshoot of the SOA abstraction principle, where underlying implementation specifics of software components are abstracted from other software components.

Poorly designed SOA solutions, like any poorly designed software solution, can result in poor performance, high maintenance costs, upgrade difficulties, and a low quality user experience. These problems are not inherent in a SOA solution, but instead to software solutions in general. In other words, re-packing otherwise inadequate code into SOA components to form an "integrated" SOA solution will result in an inadequate solution. An SOA implementation does not fix underlying flaws with implementation; it instead provides a cohesive framework for permitting loosely coupled software components, which can be distributed across any computing space, to interact using standard communication protocols. Like any other software solution, disciplined adherence to well defined and well documented models, standards, and design principles, produces sound results, while ignoring basic software design principles can result in problematic code.

A SOA development effort can involve software prototyping. Software prototyping can be defined traditionally as a process of creating an incomplete model of a future full featured software program. Advantages of prototyping can include: early evaluation, obtaining feedback early in a development project; being able to determine earlier if proposed software matches a software specification; and providing some insights early on as to whether project timelines and milestones are reasonably likely to be met. Disadvantages of prototyping can include: encouraging development of software with insufficient analysis; user confusion between prototypes and finished system implementations which can result in unrealistic time expectations; extensive development time for a prototype; and an expense of implementing a prototype. Details of the advantages and disadvantages can vary based upon a type of prototyping used, which can include throwaway or rapid prototyping, evolutionary prototyping, incremental prototyping, and the like.

SUMMARY OF THE INVENTION

Unlike previous teachings, the invention discloses a multiphased approach for a SOA development effort, where SOA components are designed to remain fundamentally unchanged from one phase to the next, which includes from a prototyping phase, to a design phase, to a test phase, to a deployment phase. This approach is believed to maximize the benefits of prototyping, while minimizing or even eliminating the disadvantages.

The present invention can be implemented in accordance with numerous aspects consistent with material presented herein. For example, one aspect of the present invention can include a multiphase method for developing a service oriented architecture (SOA) solution using an SOA front end that endures throughout the SOA development lifecycle. The method can determine interface requirements between a set of services to be implemented in a SOA solution and SOA front end. The SOA front end can conform to the determined interface requirements. The SOA front end can also be interactively utilized early within and can be applicable to all phases of a SOA lifecycle, which includes design, development, and implementation phases. The SOA front end can be combined with a service emulator to form an interactive prototype of the SOA solution. The SOA front end can also be combined with a set of SOA back end components to form the SOA solution.

Another aspect of the present invention can include a software system for developing a SOA solution that includes a SOA front end, a service emulator, and a SOA back end. The SOA front end can include all client facing components providing a user experience for a SOA solution. The service emulator can be configured to satisfy service call and data needs of the SOA front end component. The SOA front end and the service emulator together can form an executable, interactive prototype of the SOA solution. The SOA back end can include a set of SOA software components that provide back end and/or middleware implemented SOA services. The SOA front end and the SOA back end can together form the SOA solution.

Still another aspect of the present invention can include a software prototype for a service oriented architecture (SOA) solution including a SOA front end and a service emulator. The software prototype can be an executable, interactive software application. The SOA front end can be pluggable without modification within a final SOA solution in which the service emulator is replaced by SOA back end components.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
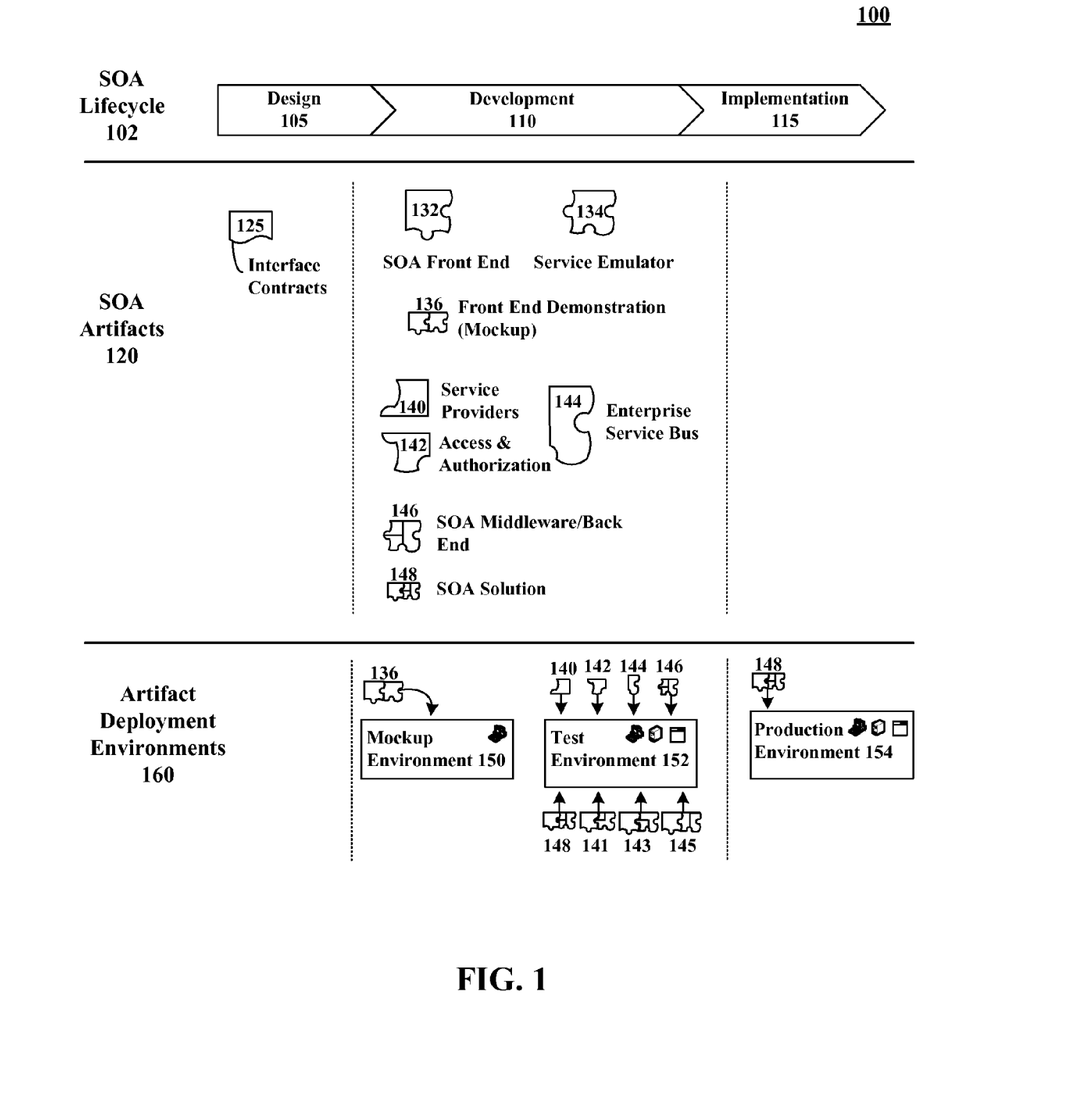
FIG. 1 is a diagram showing a service oriented architecture (SOA) having front end SOA components realized early within and applicable to all phases of a SOA lifecycle, which includes design, development, and implementation phases.

FIG. 1 is a diagram 100 showing a service oriented architecture (SOA) having front end 132 components realized early within and applicable to all phases of a SOA lifecycle 102, which includes design 105, development 110, and implementation 115 phases. Creation of enduring SOA front end 132 components can require a level of foreknowledge of the detailed workings of final SOA solution 148 within which the front end 132 will be used. The SOA front end 132 components can be client-facing software components that are responsible for providing a user experience. The user experience can be provided through a Web browser, a Rich Internet Interface, or any other user-interactive interface. A design artifact 120 referred to as an interface contract document 125 can specify requirements for implementing a front end 132.

To create the interface contract document 125, a set of real and/or envisioned services to be provided from the SOA back end 140-146 should be identified. A sufficient number of services should be identified at this stage to ensure that no major design changes will be required from the SOA front end 132, when integrating the front end 132 in a final SOA solution 148. Document 125 is effectively a contract, which ensures that if a front end 132 is designed in accordance with the interface requirements specified within, that the interface will operate within and satisfy user interaction requirements of the solution 148. The solution 148 is to be deployed within a production environment 154 during an implementation phase 115 of the lifecycle 102. Other components of diagram 100 must adhere to the interface requirements of document 125, as well.

Once interface contract document 125 has been specified, the SOA front end 132 development can proceed independent of the development of a SOA middleware/back end portion of the SOA solution 148. Typically, the front end 132 can be designed before the middleware/back end 140-146, since this permits a prototype or mockup based upon the front end 132 to be created and evaluated. More specifically, the front end 132 can be combined with a service emulator 134 to create a front end demonstration or mockup 136 (e.g., working prototype) able to be deployed in a mockup environment 150. The service emulator 134 can satisfy the service and data needs of front end 132.

In one arrangement, the mockup environment 150 can be implemented within a single computing system, such as a notebook computer. This arrangement enables the mockup 136 to be a stand-alone, portable product, which can be used for demonstration and marketing purposes, even when network connectively is not available. In one embodiment, the mockup 136 can be contained within a virtual machine (e.g., VMware Virtual Machine, for example), which can be played on any client having a compatible virtual machine hosting software. The invention is not limited in this regard, however, and the front end 132 can be implemented upon a different computing device than emulator 134 to create a mockup 136 distributed across a network space.

During a testing phase involving test environment 152, the front end 132 can be executed with combinations 141, 143, 145 of emulated backend components and developmental middleware/back end components 140, 142, 144. The individual components 140, 142, 144 can also be separately tested in environment 152.

After all components 140-144 have been developed and tested, a full SOA solution 148 can be deployed to a production environment 154. Even after deployment, the mockup 136 can be advantageously used in a stand-alone fashion by marketing personnel, for demonstrations, and the like.

Figure 2:
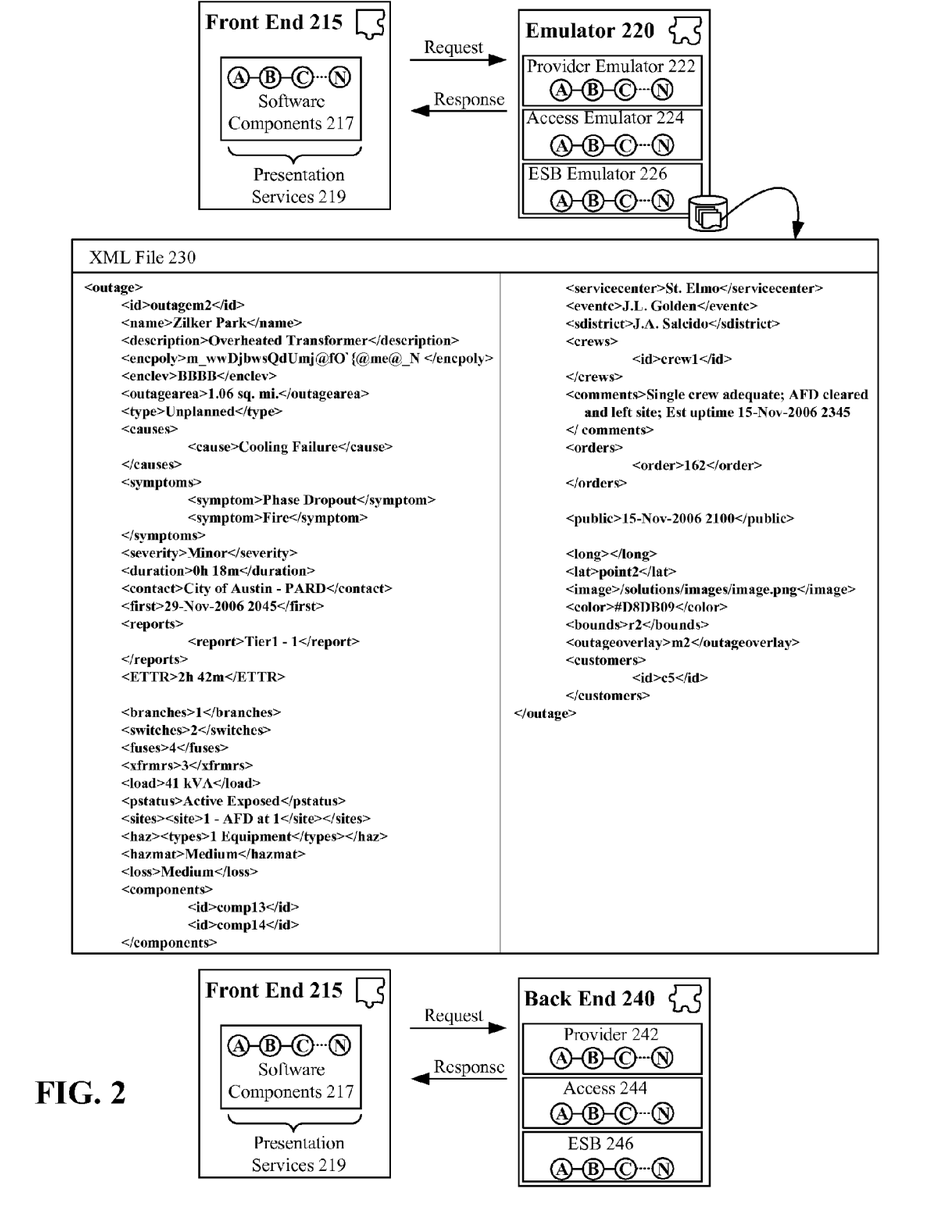
FIG. 2 is a schematic diagram illustrating a front end for a SOA solution, which is able to be utilized in a substantially unchanged manner throughout a SOA lifecycle in accordance with an embodiment of the inventive arrangements disclosed herein.

FIG. 2 is a schematic diagram illustrating a front end 215 for a SOA solution, which is able to be utilized in a substantially unchanged manner throughout a SOA lifecycle in accordance with an embodiment of the inventive arrangements disclosed herein. The front end 215 can include a number of SOA based software components 217, which interact with each other and with other SOA solution components through SOA compliant interfaces. The components 217 can provide presentation services 219 for client-side interactions. The front end 215 effectively controls a user's experience with a SOA solution.

Early in a development process, the front end 215 can be paired with an emulator 220, which interacts with the front end 215 providing services and data in exactly the same manner as a SOA back end 240 does later in the development cycle. At a time the emulator 220 is used, the back end 240 components need not be implemented. Additionally, the emulator 220 can be locally implemented to create a stand-alone and portable SOA solution, which can be presented as a prototype during demonstrations and marketing engagements. Unlike traditional prototypes, which are generally discarded during the design process and/or which are significantly modified during a lifecycle, the prototype formed from front end 215 and emulator 220 provides a user experience substantially identical to that which will be provided by the final SOA solution—formed by the same, unmodified front end 215 and back end 240.

Emulator 220 can utilize a series of files or data stores, such as file 230, when interacting with the front end 215. These files can be coded against the interface contracts, such as contract 125, upon which the front end 215 was designed. The files 230 provided by the emulator 220 should be identical in nature to those provided by the back end 240.

Figure 4:
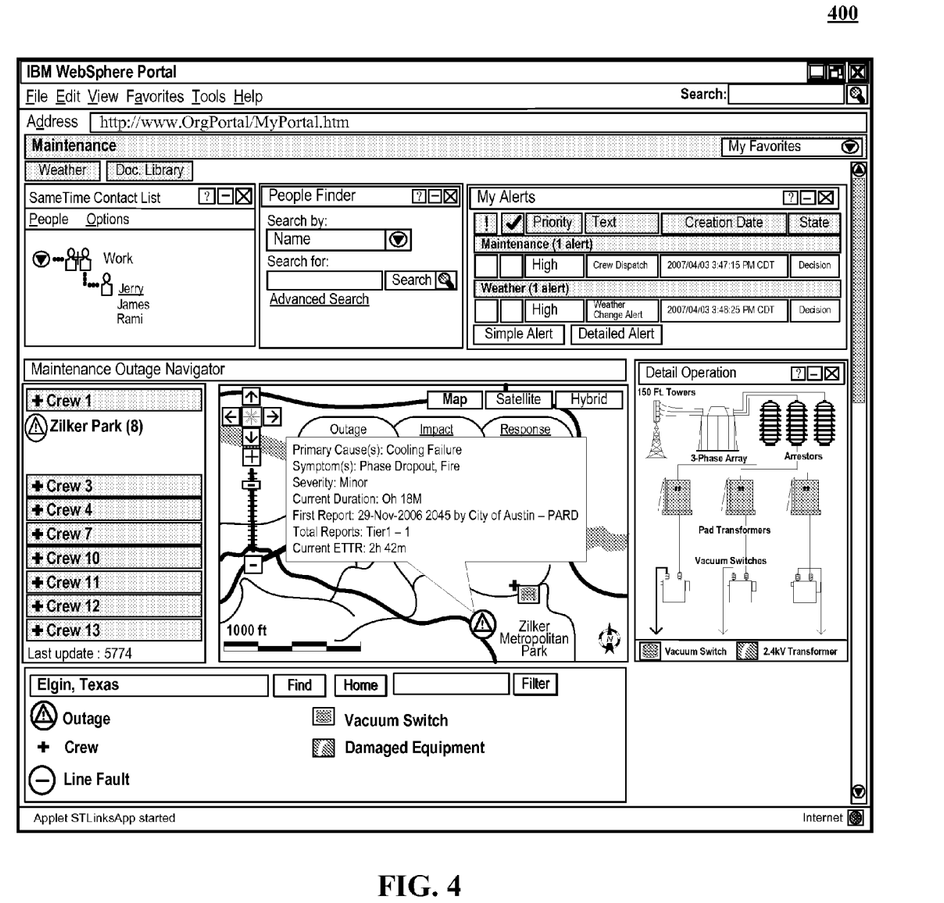
FIG. 4 is a sample graphical user interface, which can result from an execution of a fully functional SOA front end.

As shown, file 230 represents an XML file for a portal mashup, which federates data from multiple sources. Specifically, the portal mashup can be an electric distribution system (e.g., a local utility) "outage" portal, as shown in FIG. 4. The outage portal can track trouble spots, their causes, failure systems, responses (e.g., personnel and equipment) and overall system health. The back end 240 for the utility outage portal can require an integration of services from several back end systems, each of which deal with various topographies (e.g., power load flow, equipment testing, crew skills and deployment, parts and logistics, etc.).

In one optional arrangement, the emulator 220 can be constructed in a modular fashion. Each modular unit of emulator 220 can, for example, be a set of one or more SOA components 222-226. As shown, emulator 220 can include a back end service provider emulator component 222, an access and authorization emulator component 224, and an enterprise service bus component 226. Each of these components 222-226 can correspond to an equivalent back end 240 component 242-246, which is being emulated. Different files 230 can be associated with the different components 222-226. Use of modular emulation components 222-226 can permit a user/designer to emulate back end services at different component levels, which can be useful during development and testing. For example, when service provider components 242 are completed, but access and authorization components 244 are not, a testing system can use the front end 215, the provider component 242, and the access emulator 224 and ESB 226 emulator components to produce an apparently fully functional solution. When other back end components 244-246 are completed, they can be used instead of their emulation equivalents 224-226.

Figure 3:
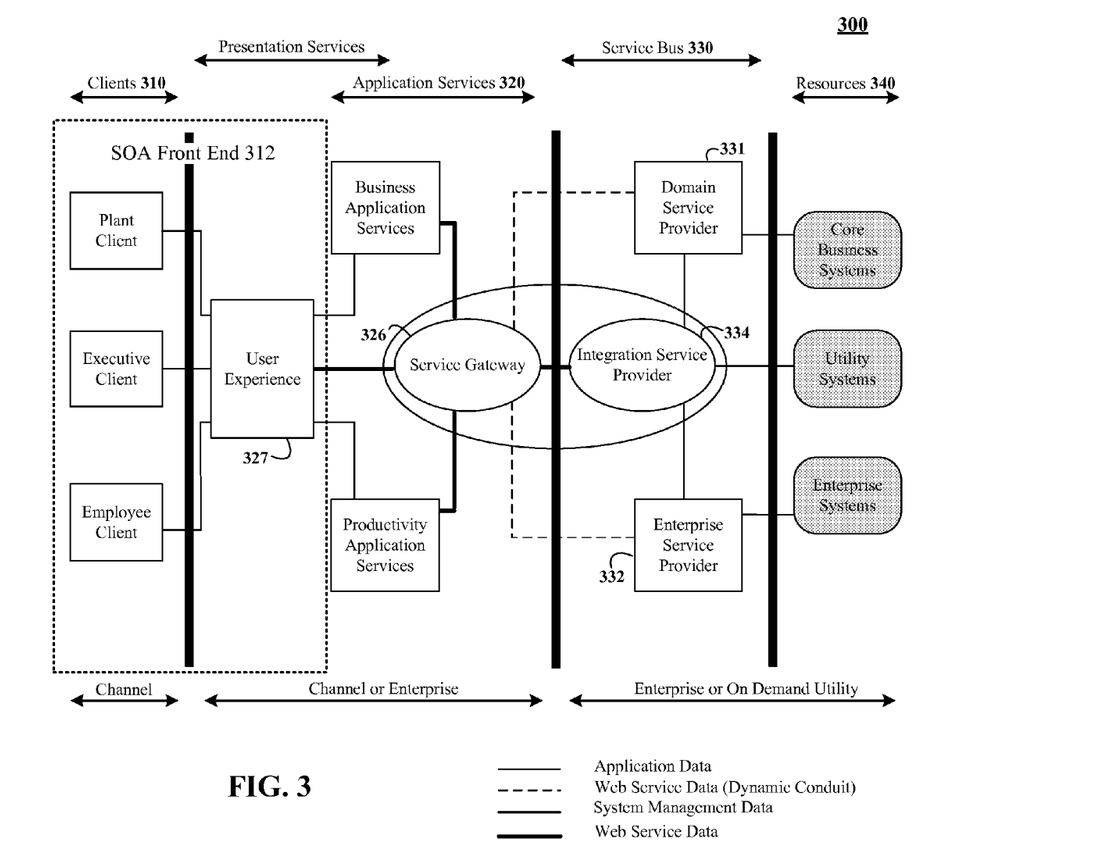
FIG. 3 is a schematic diagram of a SOA implementation, where one or more SOA components endure throughout a SOA lifecycle in accordance with an embodiment of the inventive arrangements disclosed herein.

FIG. 3 is a schematic diagram of a service oriented architecture (SOA) 300 implementation, where one or more SOA component endure throughout a SOA lifecycle in accordance with an embodiment of the inventive arrangements disclosed herein. As shown by SOA 300, the loosely coupled nature is advantageous in connecting back end resources 340 via a service bus 330 to a service gateway 326 for use by a portal server 327. The SOA 300 environment can also make customizing user experiences for different clients 310 easier than would be possible with a more rigid architecture.

As shown, for example, a portal workplace and its portlets can map to layer 310 of the SOA 300. Multiple user roles and their associated Web browsers can access the presentation and application services 320. The presentation and application services 320 can include the user experience portal server 327 and various support applications, such as an organization directory, instant messaging, and content management (library) systems. The SOA front end 312 includes both a layer of the SOA that provides a user experience to clients, as well as the client layer 310.

Various back end resources 330-340 can yield data to be used directly or to-be-federated data. Resource 340 contributions must be fetched, coordinated, and appropriately transformed. The use of domain 331 and enterprise 332 service providers allows the isolation and insulation of back end systems, while allowing access to their functions via Web Services interfaces. The integration service provider 334 can integrate information from the other service providers 331, 332 and can communicate with a service gateway 326. The service gateway 326 can implement dynamic binding, request/response decomposition/composition, and content-based routing of document-literal Extensible Markup Language (XML) requests generally arriving via Web Services, and provide protocol conversion if necessary.

It should be emphasized that the architecture 300 is shown for illustrative purposes only and that the scope of the invention is not to be limited in this regard. For instance, other SOA architectures not having an integration service provider 334 component can be used.

FIG. 4 is a sample graphical user interface (GUI) 400, which can result from an execution of a fully functional SOA front end. The interface 400 provided when the SOA front end is integrated to a service emulator can be substantially identical (other than potential differences between sample and real data) to an interface 400 provided when the SOA front end is integrated as part of a SOA solution.

Details illustrated in GUI 400 are specifically tailored to represent a possible outage mockup, which uses XML flat file 230 illustrated in FIG. 2. All icon positioning and associated data in the "mashup" shown in interface 400 can be driven by a set of XML files, including file 230. The business logic within the portal server code and pages can represent exactly that to be used in a full SOA implementation. Only the access mechanism for data differs, which comes from outside the user interface layer.

Figure 5:
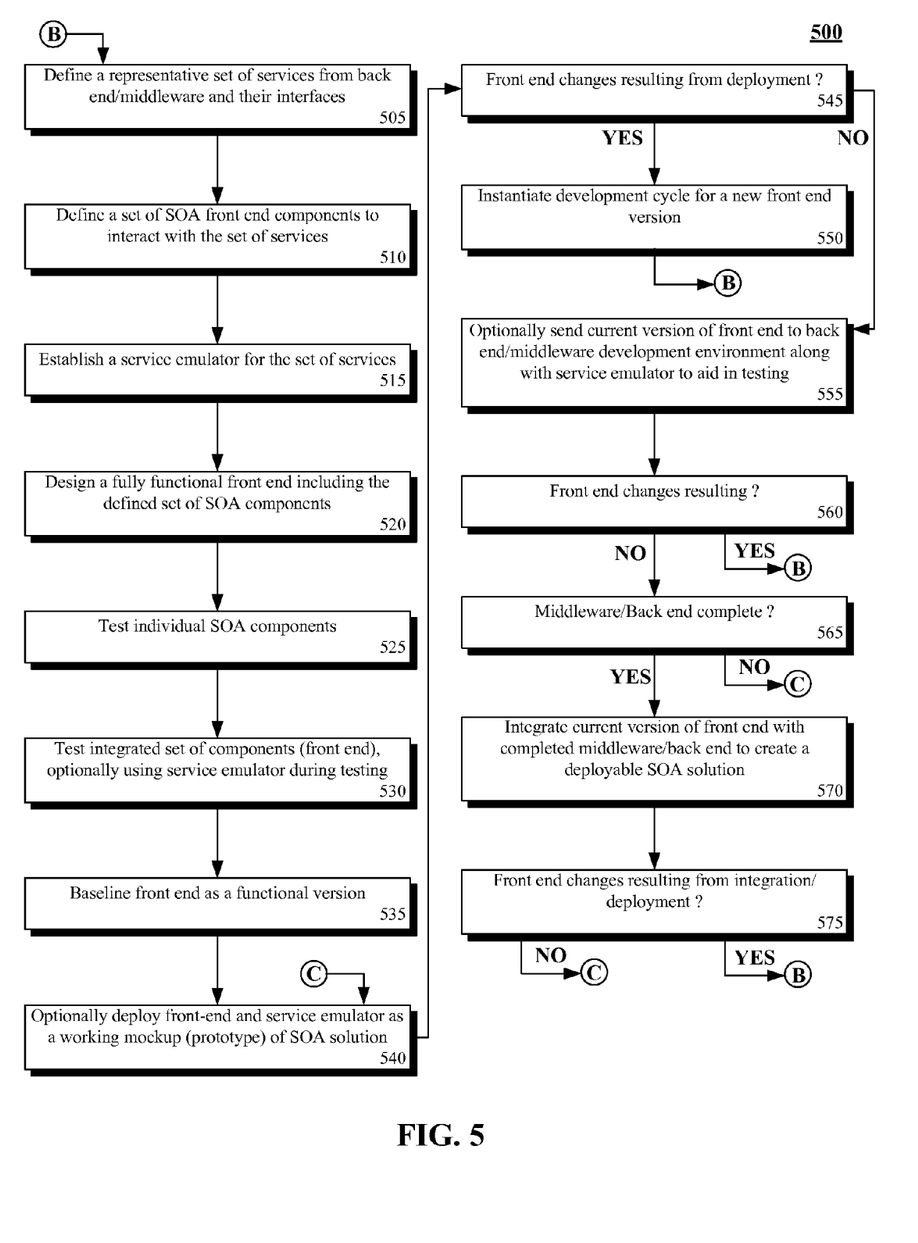
FIG. 5 is a flow chart of a method for creating fully functional SOA front end components, which can used in an essentially unchanged fashion across multiple stages of a SOA lifecycle in accordance with an embodiment of the inventive arrangements disclosed herein.

FIG. 5 is a flow chart of a method 500 for creating fully functional SOA front end, which can used in an essentially unchanged fashion across multiple stages of a SOA lifecycle in accordance with an embodiment of the inventive arrangements disclosed herein. Essentially unchanging recognizes that any fully functioning software artifact, such as the SOA front end described herein, can naturally evolve or change over time. A common mechanism to control this evolution is to baseline different versions of a software product, where a set of iterative improvement or changes are incorporated in later versions. Because the SOA front end implemented herein can be a fully functional product able to be used for prototyping purposes, for testing of other SOA components, and/or for deployment purposes, it can be versioned in a manner independent of other SOA components.

Method 500 can begin in step 505, where a representative set of services from a back end/middleware portion of a SOA project can be defined along with a set of interfaces for exchanging content. In step 510, a set of SOA front end components can be modeled/defined in a manner so that these components are able to interface with the services defined in step 505. In step 515, a service emulator for the set of services can be established. A fully functioning front end that includes the defined/modeled set of SOA front end components can be designed and coded in step 520. Individual ones of these front end SOA components can be tested (step 525) before an integration test of all front end components is conducted in step 530. Once testing is successfully completed, the SOA front end solution can be baselined as a functional version, as shown by step 535. Once baselined, the front end and service emulator can be optionally deployed as a working mockup or prototype of the SOA solution, as shown by step 540. Feedback can result from use of the prototype in step 545, which can initiate a development cycle based upon these changes for a new version of the SOA front end, which is indicated by step 550. A new development cycle can repeat the previous design steps, which is shown by the method proceeding from step 550 to step 505, where feedback induced changes can be incorporated within a design process.

When no changes are to be implemented in step 545, the method can proceed to step 555, where a current version of the front end can be optionally used by designers/developers of back end components. Use of a fully functional front end can, in certain situations, make testing one or more SOA back end or middleware components easier. Additionally, the service emulator that operates with the front end can be designed in a modular fashion so that individual service components or sets of components simulated by the emulator can be replaced with under development/under test SOA back end/middleware components. In other words, use of the modular emulator can permit a user to isolate behavior differences during testing to a developer determined set of SOA components. In step 560, use of the front end during testing can result in feedback for improvements/changes to the front end components. These changes can result in new version of the front end being developed, shown by the method path from step 560 to step 505.

Otherwise, a determination can be made as to whether middleware/back end SOA components have been completed. In not, a current version of the front end can continue to be used for prototyping, testing other portions of the SOA system, and the like, shown by proceeding in the method from step 565 to step 540. Once the remaining components of the SOA solution are complete, the method can proceed from step 565 to step 570, where a current version of the front end can be integrated with a completed version of the middleware/back end to create a deployable SOA solution. Step 575 shows that front end changes can result from integration/deployment with the other SOA components, which can cause a new version design effort for the front end to initiate, shown by proceeding from step 575 to step 505. When no deployment driven front end changes are indicated, other uses of the front end can continue, which can result in improvements incorporated in subsequent versions, shown by selectively proceeding from step 575 to step 540.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A multi-phased method for developing a service oriented architecture (SOA) solution comprising:
    determining interface requirements for a set of services to be implemented between a SOA solution and a SOA front end; and
    creating the SOA front end conforming to the determined interface requirements, wherein the SOA front end is configured to be combined with a service emulator to form an interactive prototype of the SOA solution, and wherein the SOA front end is configured to be combined with a set of SOA back end components to form said SOA solution.

2. The method of claim 1, further comprising: creating at least one file or data store based upon the determined interface requirements, wherein said file or data store provides a response to a service request from the SOA back end components based upon the determined interface requirements.

3. The method of claim 1, wherein the file or data store comprises data configured to be representative of results achieved when using the set of SOA back end components to federate data from a plurality of back end sources.

4. The method of claim 1, further comprising: marketing said SOA solution using said interactive prototype before said set of SOA back end components are completed.

5. The method of claim 1, further comprising: utilizing said SOA front end during a testing phase of at least one of the SOA back end components.

6. The method of claim 1, further comprising: soliciting feedback from users of the interactive prototype before said set of SOA back end components are completed; and modifying user experience features of said SOA front end based upon said feedback without affecting interactions between said SOA front end and said SOA back end components, and without affecting interactions between said SOA front end and said service emulator.

7. The method of claim 1, further comprising: after creation, establishing a version for the SOA front end; and conducting development efforts that increase an associated version of the SOA front end independent of activities relating to the SOA back end components.

8. The method of claim 1, wherein the SOA front end, the service emulator, the SOA back end, the prototype, and the SOA solution are software stored on at least one machine readable medium that contain programmatic instructions configured to be executed by at least one machine reading the instructions from said at least one machine readable medium.

9. A software system for developing a service oriented architecture (SOA) solution comprising:
    a SOA front end comprising all client facing components providing a user experience for a SOA solution;
    a service emulator configured to satisfy service call and data needs of the SOA front end component, wherein the SOA front end and the service emulator together form an executable, interactive prototype of the SOA solution; and
    a SOA back end comprising a plurality of software components that provide back end and middleware services, wherein the SOA front end and the service emulator together form the SOA solution, wherein the SOA front end, and the SOA back end, the prototype, and the SOA solution are software stored on at least one non-transitory machine readable medium that contain programmatic instructions configured to be executed by at least one non-transitory machine reading the instructions from said at least one machine readable medium.

10. The software system of claim 9, further comprising: an interface contract document defined early in a development lifecycle of the SOA solution, wherein the interface contract document defines interactions to occur between the SOA front end and services provided by the SOA back end, wherein the service emulator and the SOA front end are coded to conform to interface standards specified by the interface contract document.

11. The software system of claim 9, wherein said prototype is configured to execute upon a computing device in a stand-alone fashion, and wherein the SOA front end and the service emulator are software implemented instructions stored within a data store local to the computing device.

12. The software system of claim 9, wherein the service emulator utilizes at least one XML file to emulate output delivered to the SOA front end by the SOA back end components.

13. The software system of claim 9, wherein said SOA front end provides an interface renderable in a Web browser.

14. The software system of claim 9, wherein the SOA front end provides a Web portal renderable in the Web browser.

15. A software prototype for a service oriented architecture (SOA) solution comprising:
a SOA front end comprising all client facing components providing a user experience for a SOA solution; and
a service emulator configured to satisfy service call and data needs of the SOA front end component, wherein the software prototype is an executable, interactive software application, wherein the SOA front end is pluggable without modification to final SOA solution in which the service emulator is replaced by SOA back end components, wherein the SOA front end and the service emulator are both software instances stored on at least one non-transitory machine readable medium that contain programmatic instructions configured to be executed by at least one machine reading the instructions from said at least one non-transitory machine readable medium.

16. The prototype of claim 15, wherein the SOA front end and the service emulator are stored upon a local storage space of a computing device, which is able to execute the software prototype in a stand-alone fashion.

17. The prototype of claim 15, wherein the SOA front end and the service emulator are implemented within different storage spaces and processing units connected to each other via a network, wherein communications between the service emulator and the SOA front end over the network conform to SOA protocols and standards.

18. The prototype of claim 15, wherein the service emulator utilizes at least one XML file to emulate output delivered to the SOA front end by the SOA back end components.

19. The prototype of claim 15, wherein the emulator comprises a plurality of back end emulation components, wherein each of these emulation components are configured to be substitutable on a per-component basis with an equivalent one of the SOA back end components, thereby providing SOA solution designers an option to run a solution consisting of the SOA front end and combinations of emulation components and SOA back end components so long as a complete set of solution components are used regardless of whether these components are real SOA back end components or emulation components.

* * * * *